United States Patent
Lee et al.

(10) Patent No.: US 10,082,148 B2
(45) Date of Patent: Sep. 25, 2018

(54) SURGE PREVENTION APPARATUS AND METHOD FOR CENTRIFUGAL COMPRESSOR

(71) Applicant: Electronics and Telecommunications Research Institute, Daejeon (KR)

(72) Inventors: Joa-Hyoung Lee, Daejeon (KR); Gwang-Ja Jin, Daejeon (KR); You-Hee Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 14/796,414

(22) Filed: Jul. 10, 2015

(65) Prior Publication Data
US 2016/0053766 A1 Feb. 25, 2016

(30) Foreign Application Priority Data
Aug. 20, 2014 (KR) .................. 10-2014-0108130

(51) Int. Cl.
*F04D 27/02* (2006.01)
(52) U.S. Cl.
CPC ..... *F04D 27/0284* (2013.01); *F04D 27/0215* (2013.01); *F04D 27/0261* (2013.01)
(58) Field of Classification Search
CPC ............. F04D 27/0284; F04D 27/0215; F04D 27/0261; F04D 27/02; F04D 27/0207; F04D 27/0223
See application file for complete search history.

(56) References Cited

U.S. PATENT DOCUMENTS

| | | | |
|---|---|---|---|
| 4,156,578 A | * | 5/1979 | Agar ..................... F04D 27/001 415/1 |
| 4,627,788 A | | 12/1986 | Keyes, IV |
| 2011/0132543 A1 | | 6/2011 | Yu |
| 2012/0268855 A1 | | 10/2012 | Chu et al. |

FOREIGN PATENT DOCUMENTS

| | | | |
|---|---|---|---|
| JP | 52011411 A | * | 1/1977 |
| KR | 1019860001957 A | | 3/1986 |
| KR | 200306589 B1 | | 2/2003 |

OTHER PUBLICATIONS

JP 52011411 A Tanslation. FLS, Inc. Washington D.C. Dec. 2017. 10 Pages.*

* cited by examiner

*Primary Examiner* — Richard Edgar
(74) *Attorney, Agent, or Firm* — William Park & Associates Ltd.

(57) ABSTRACT

Disclosed herein are a surge prevention apparatus and method for a centrifugal compressor. The surge prevention apparatus includes a control unit for controlling a gas provision operation based on a flow rate and pressure on an inlet side of a compressor and pressure on an outlet side of the compressor, and a gas provision unit for storing a part of gas flowing into the inlet side of the compressor and providing the stored gas to the inlet side in response to a control signal from the control unit.

15 Claims, 7 Drawing Sheets

PRIOR ART

SURGE PREVENTION APPARATUS AND METHOD FOR CENTRIFUGAL COMPRESSOR

CROSS REFERENCE TO RELATED APPLICATION

This application claims the benefit of Korean Patent Application No. 10-2014-0108130, filed Aug. 20, 2014, which is hereby incorporated by reference in its entirety into this application.

BACKGROUND OF THE INVENTION

1. Technical Field

The present invention generally relates to a surge prevention apparatus and method for a centrifugal compressor and, more particularly, to an apparatus and method that prevent a surge from occurring to maintain high performance in a centrifugal compressor.

2. Description of the Related Art

A centrifugal compressor transfers kinetic energy by rotating gas or air inhaled via a suction pipe using an impeller, and compresses gas or air by converting kinetic energy into pressure depending on resistance at a discharge pipe.

Figure 1:
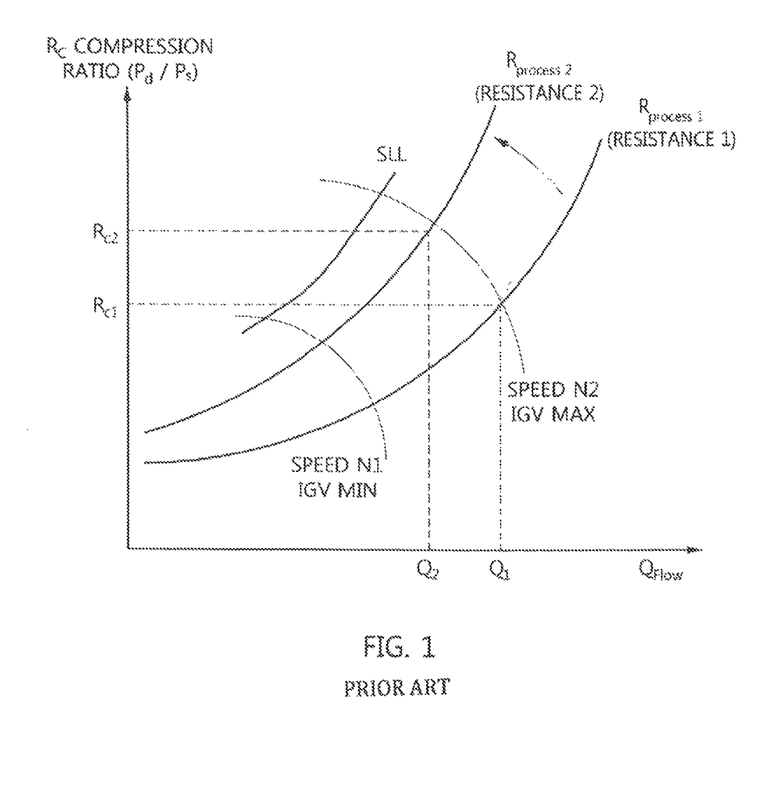
FIG. 1 is a graph showing the performance curve of a centrifugal compressor.

As illustrated in FIG. 1, the performance of a centrifugal compressor may be represented by a compression ratio versus discharge curve. The compression ratio of the centrifugal compressor is increased as the speed of an impeller is higher, resistance at a discharge pipe is larger, and the rate of an input flow is lower.

When the speed of the impeller is constant, resistance must be raised and a flow rate must be decreased so as to maximize the performance of the centrifugal compressor.

However, when resistance is excessively high and a flow rate is too low to recover the resistance, a phenomenon in which air or gas contained in the discharge pipe flows backwards due to the resistance may occur. Such a phenomenon is called a 'surge'.

A surge occurring in the centrifugal compressor stresses the impeller and may damage the impeller. A state in which a surge will possibly occur is referred to as a "Surge Limit Line: SLL". When the performance state of the centrifugal compressor approaches an SLL, a surge may occur, and thus a scheme for preventing such a surge is required.

Figure 2:
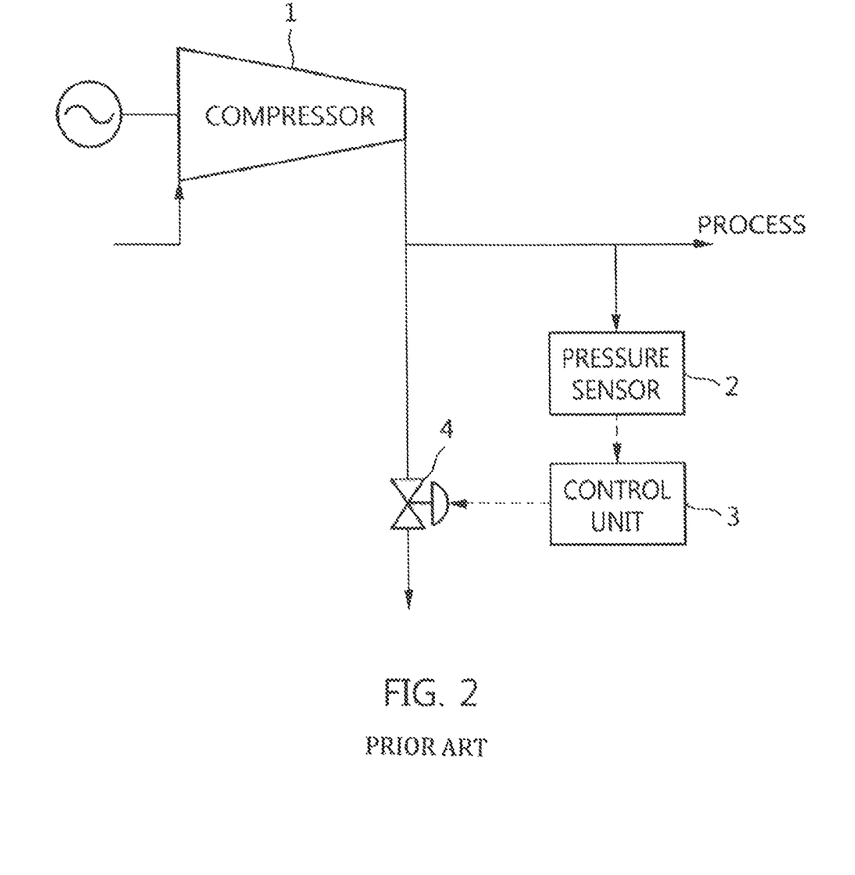
FIG. 2 is a diagram showing a conventional blow-off scheme.

As the simplest method for preventing the occurrence of a surge in the centrifugal compressor, there is a blow-off scheme in which, as shown in FIG. 2, a valve 4 is installed on a discharge pipe to adjust the resistance on the discharge pipe, and in which the valve 4 is opened to discharge gas to the outside of the compressor when the possibility of a surge occurring is increased. In FIG. 2, reference number 2, not described, denotes a pressure sensor for sensing the pressure of the discharge pipe, and reference numeral 3, not described, denotes a control unit for controlling the opening/closing of the valve 4 based on the pressure value sensed by the pressure sensor 2.

The blow-off scheme illustrated in FIG. 2 discharges and dumps air or gas compressed by a compressor 1 to the outside of the compressor, thus resulting in the effect of decreasing resistance on the discharge pipe. However, the blow-off scheme is problematic in that a part of gas or air compressed by the compressor 1 is dumped, thus decreasing efficiency, and reducing production in the case of a system for producing gas.

In order to reduce the disadvantage of the blow-off scheme, a recycle scheme is present in which gas discharged from a discharge pipe is returned (re-input) to the compressor rather than being discharged to the outside of the compressor.

Figure 3:
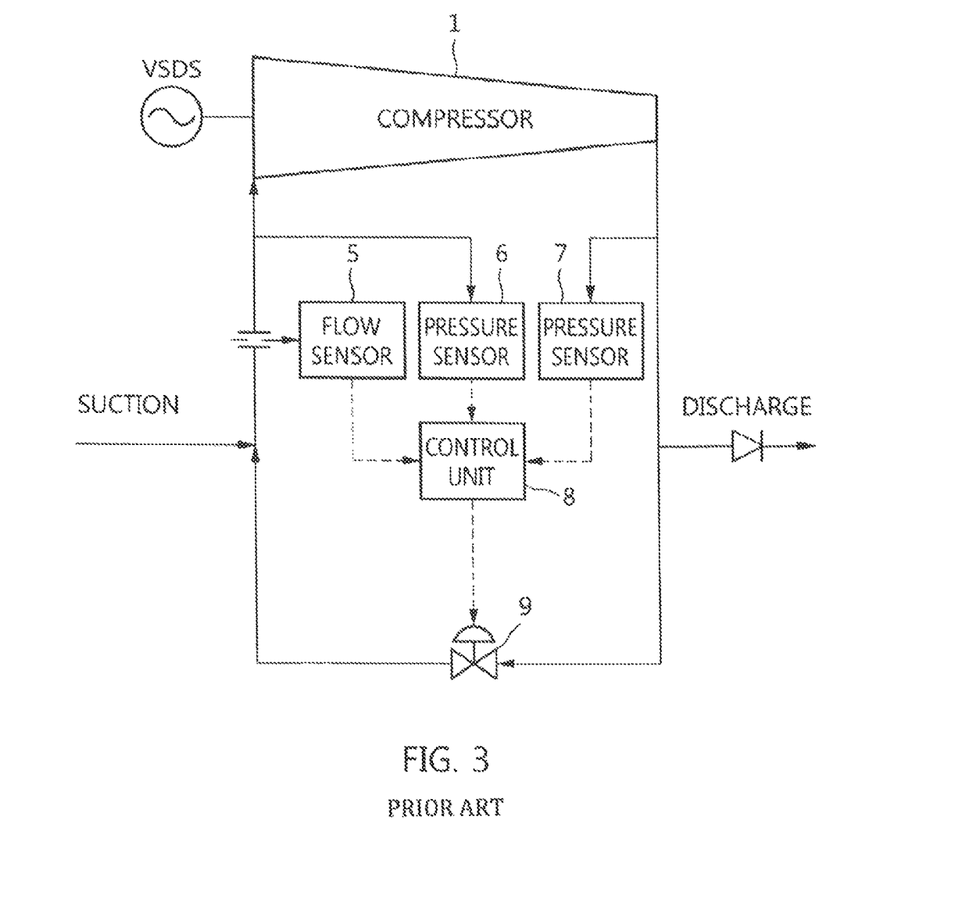
FIG. 3 is a diagram showing a conventional recycle scheme.

Such a recycle scheme is operated in a way almost identical to that of the blow-off scheme. However, as shown in FIG. 3, when a possibility of a surge occurring is strong, the output gas is returned to the compressor 1, so that resistance on a discharge pipe (outlet side) may be decreased and the flow rate of gas input to the compressor 1 may be raised, thus more effectively preventing a surge from occurring. In FIG. 3, reference numeral 5, not described, denotes a flow sensor for sensing the rate of a flow on a suction pipe, reference numeral 6, not described, denotes a pressure sensor for sensing pressure on the suction pipe, and reference numeral 7, not described, denotes a pressure sensor for sensing pressure on the discharge pipe. Reference numeral 8, not described, denotes a control unit for controlling the opening/closing of a valve 9 based on the values sensed by the flow sensor 5 and the pressure sensors 6 and 7.

Since the recycle scheme illustrated in FIG. 3 returns the output gas to the compressor 1, gas discharged to the outside is not present, and thus production is not reduced compared to the blow-off scheme. However, the recycle scheme illustrated in FIG. 3 must additionally compress gas that was already compressed once, thus deteriorating the overall efficiency of the compressor.

As related preceding technology, Korean Patent Application Publication No. 1986-0001957 discloses technology for presenting a parallel-structure compression scheme in which, in order to prevent a surge from occurring in a centrifugal compressor, a bypass line that does not pass by the inlet and outlet of the compressor is formed and a reciprocating compressor is installed on the bypass line.

SUMMARY OF THE INVENTION

Accordingly, the present invention has been made keeping in mind the above problems occurring in the prior art, and an object of the present invention is to provide a surge prevention apparatus and method for a centrifugal compressor, which control the flow rate of gas input to the suction pipe of the centrifugal compressor so as to reduce a possibility of a surge occurring in the centrifugal compressor.

Another object of the present invention is to provide a surge prevention apparatus and method for a centrifugal compressor, which can reduce the amount of gas that is returned to the centrifugal compressor when gas output from a discharge pipe is recycled, in order to reduce a possibility of a surge occurring in the centrifugal compressor.

In accordance with an aspect of the present invention to accomplish the above objects, there is provided a surge prevention apparatus for a centrifugal compressor, including a control unit for controlling a gas provision operation based on a flow rate and pressure on an inlet side of a compressor and pressure on an outlet side of the compressor; and a gas provision unit for storing a part of gas flowing into the inlet side of the compressor and providing the stored gas to the inlet side in response to a control signal from the control unit.

The gas provision unit may include a gas tank installed on the inlet side of the compressor; a first valve configured to control a flow of gas that is input from the inlet side to the gas tank; and a second valve configured to control a flow of gas from the gas tank to the compressor.

The gas provision unit may further include a third valve for controlling a flow of gas that is input from the outlet side of the compressor to the gas tank.

The control unit may control the first to third valves based on values sensed by a flow sensor and a first pressure sensor installed on the inlet side of the compressor and by a second pressure sensor installed on the outlet side of the compressor.

The control unit may be configured to, if it is determined based on the sensed values that the compressor is normally operated, open the first valve and close the second valve and the third valve.

The control unit may be configured to, if it is determined based on the sensed values that a possibility of a surge occurring in the compressor is strong, close the first valve and open the second valve when a cause of the strong surge possibility is due to a low flow rate on the inlet side of the compressor.

The control unit may be configured to, if it is determined based on the sensed values that a possibility of a surge occurring in the compressor is strong, open the third valve when a cause of the strong surge possibility is due to high resistance on the outlet side of the compressor.

In accordance with another aspect of the present invention to accomplish the above objects, there is provided a surge prevention apparatus for a centrifugal compressor, including a control unit for controlling a gas provision operation based on a flow rate and pressure on an inlet side of a compressor and pressure on an outlet side of the compressor; and a gas provision unit for storing a part of gas from the outlet side in response to a control signal from the control unit, and providing the stored gas to the inlet side of the compressor in response to a control signal from the control unit.

The gas provision unit may include a gas tank installed on the outlet side of the compressor; a first valve configured to control a flow of gas that is input from the outlet side to the gas tank; and a second valve configured to control a flow of gas from the gas tank to the outlet side of the compressor.

The gas provision unit may further include a third valve for controlling a flow of gas that is input from the gas tank to the inlet side of the compressor.

The control unit may control the first to third valves based on values sensed by a flow sensor and a first pressure sensor installed on the inlet side of the compressor and by a second pressure sensor installed on the outlet side of the compressor.

The control unit may be configured to, if it is determined based on the sensed values that the compressor is normally operated, close the first valve and the third valve and open the second valve.

The control unit may be configured to, if it is determined based on the sensed values that a possibility of a surge occurring in the compressor is strong, open the third valve when a cause of the strong surge possibility is due to a low flow rate on the inlet side of the compressor.

The control unit may be configured to, if it is determined based on the sensed values that a possibility of a surge occurring in the compressor is strong, open the first valve and close the second valve and the third valve when a cause of the strong surge possibility is due to high resistance on the outlet side of the compressor.

In accordance with a further aspect of the present invention to accomplish the above objects, there is provided a surge prevention method for a centrifugal compressor, including determining, by a control unit, whether a possibility of a surge occurring in a compressor is strong, based on values sensed by a flow sensor and a first pressure sensor on an inlet side of the compressor and by a second pressure sensor on an outlet side of the compressor; if it is determined that the possibility of a surge occurring in the compressor is strong, storing, by the control unit, a part of gas from the outlet side of the compressor in a gas provision unit installed on the outlet side of the compressor when a cause of the strong surge possibility is due to high resistance on the outlet side; and if it is determined that the possibility of a surge occurring in the compressor is strong, providing, by the control unit, the gas stored in the gas provision unit to the inlet side of the compressor when a cause of the strong surge possibility is due to a low flow rate on the inlet side.

The gas provision unit may include a gas tank installed on the outlet side of the compressor, a first valve configured to control a flow of gas that is input from the outlet side to the gas tank, a second valve configured to control a flow of gas from the gas tank to the outlet side of the compressor, and a third valve configured to control a flow of gas that is input from the gas tank to the inlet side of the compressor, and storing the part of gas from the outlet side of the compressor in the gas provision unit may include opening the first valve and closing the second valve and the third valve.

The gas provision unit may include a gas tank installed on the outlet side of the compressor, a first valve configured to control a flow of gas that is input from the outlet side to the gas tank, a second valve configured to control a flow of gas from the gas tank to the outlet side of the compressor, and a third valve configured to control a flow of gas that is input from the gas tank to the inlet side of the compressor, and providing the gas stored in the gas provision unit to the inlet side may include opening the third valve.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 4:
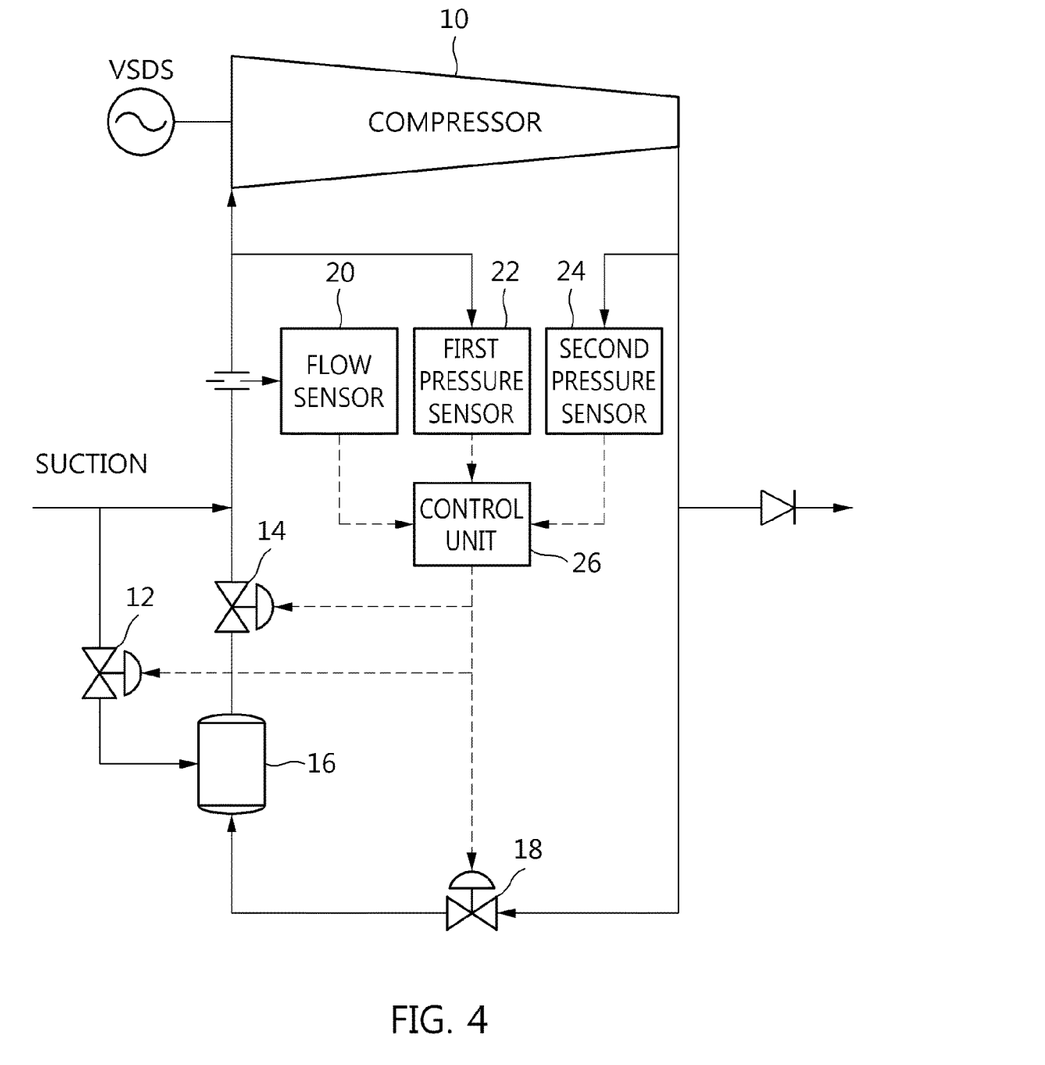
FIG. 4 is a diagram showing the configuration of a surge prevention apparatus for a centrifugal compressor according to a first embodiment of the present invention.

FIG. 4 is a diagram showing the configuration of a surge prevention apparatus for a centrifugal compressor according to a first embodiment of the present invention.

In order to prevent a surge from occurring in a centrifugal compressor, the flow rate of gas input to a suction pipe must be raised or resistance induced on a discharge pipe must be decreased.

In an existing recycle scheme, a method of decreasing resistance and raising a flow rate by returning output gas to a compressor is used. The reason for this is that it is difficult to control the flow of gas that is input to the compressor.

The configuration of FIG. 4 may be regarded as a scheme for controlling the flow rate of gas that is input to a compressor 10. The configuration of FIG. 4 is characterized in that a gas tank 16 that is a gas storage space is installed on the inlet side of the compressor 10, thus reducing the occurrence of a surge.

The surge prevention apparatus for a centrifugal compressor shown in FIG. 4 includes a first valve 12, a second valve 14, the gas tank 16, a third valve 18, a flow sensor 20, a first pressure sensor 22, a second pressure sensor 24, and a control unit 26.

The first valve 12 (valve 1), the second valve 14 (valve 2), and the gas tank 16 are installed on the inlet side (i.e., suction pipe side) of the compressor 10. Here, the first valve 12 controls the flow of gas that is input to the gas tank 16. The second valve 14 controls the flow of gas from the gas tank 16 to the compressor 10. By means of the first and second valves, gas is stored in the gas tank 16 while the centrifugal compressor is normally operated, and then the gas tank 16 is opened to increase the amount of gas (i.e., flow rate) input to the compressor 10 when a possibility of a surge occurring becomes strong, thus preventing a surge from occurring. The operation of opening/closing the first valve 12 and the second valve 14 is performed under the control of the control unit 26.

The third valve 18 (valve 3) is maintained in a closed state when the compressor 10 is normally operated. The third valve 18 is opened when the amount of gas input to the compressor 10 is not small (i.e., when the amount of gas is greater than a preset reference value), and resistance on the discharge pipe is high (i.e., when resistance is higher than a preset resistance value). In other words, the third valve 18 may be regarded as controlling a recycle operation of returning (re-inputting) gas from the discharge pipe to the compressor 10. The operation of opening/closing the third valve 18 is performed under the control of the control unit 26.

The flow sensor 20 senses the amount of gas (i.e., flow rate) input to the compressor 10.

The first pressure sensor 22 senses pressure on the suction pipe (i.e., the inlet side of the compressor 10).

The second pressure sensor 24 senses pressure on the discharge pipe (i.e., the outlet side of the compressor 10).

The control unit 26 controls the opening/closing of the valves 12, 14 and 18 based on the values sensed by the flow sensor 20 and the pressure sensors 22 and 24.

VSDS shown in FIG. 4 denotes a variable speed drive system.

Although not shown in the drawing, the first valve 12, the second valve 14, and the gas tank 16 in FIG. 4 may be collectively designated as a gas provision unit. Therefore, the gas provision unit may store a part of gas flowing into the inlet side of the compressor 10 and provide the stored gas to the inlet side of the compressor 10 in response to a control signal from the control unit 26. Consequently, the first valve 12, the second valve 14, and the gas tank 16 may be an example of a gas provision unit described in claim 1 of the accompanying claims of the present invention. Of course, the third valve 18 may be added to the gas provision unit if necessary.

Figure 5:
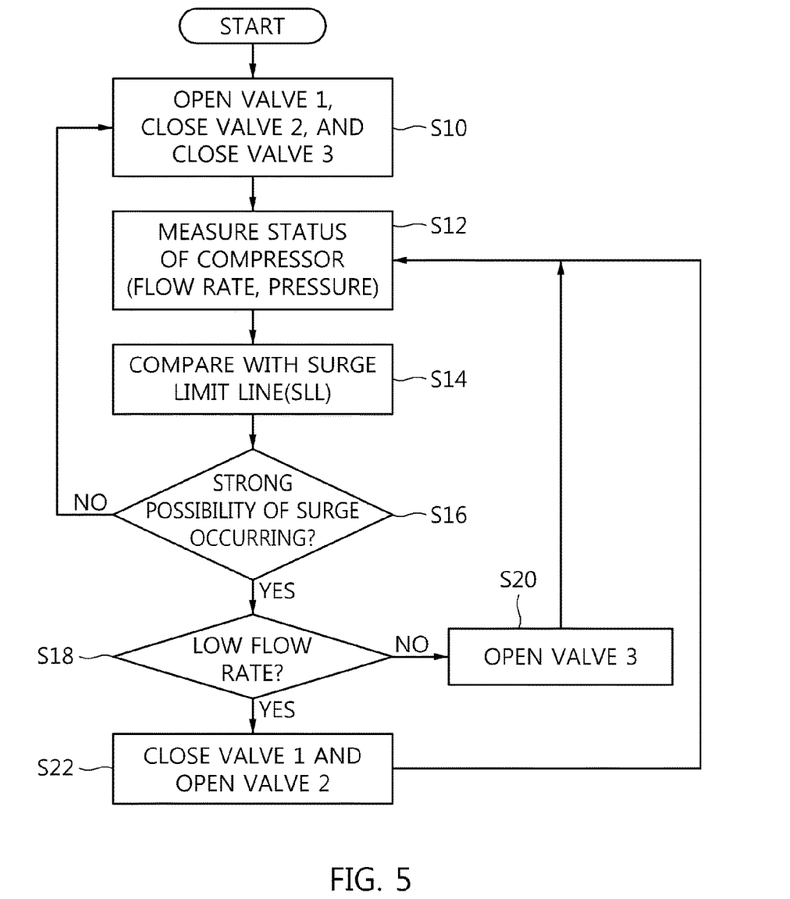
FIG. 5 is a flowchart showing a surge prevention method for a centrifugal compressor according to a first embodiment of the present invention.

FIG. 5 is a flowchart showing a surge prevention method for a centrifugal compressor according to a first embodiment of the present invention.

First, when the compressor 10 is normally operated, the first valve 12 is opened and the second valve 14 connected from the gas tank 16 to the compressor 10 is closed so that gas is input to the gas tank 16. Further, the third valve 18 for controlling recycling at the outlet (i.e., discharge pipe) of the compressor 10 is closed at step S10. At step S10, the operation of opening/closing the valves 12, 14, and 18 is performed by the control unit 26.

Thereafter, to determine whether there is a possibility of a surge occurring in the compressor 10, the status of the compressor 10 is measured at step S12. That is, the flow sensor 20 senses the flow rate of gas input to the compressor 10, the first pressure sensor 22 senses pressure on the inlet side of the compressor 10, and the second pressure sensor 24 senses pressure on the outlet side of the compressor 10. Thereafter, the control unit 26 calculates a compression ratio based on the value sensed by the flow sensor 20 (i.e., a value obtained by sensing the flow rate of gas input to the compressor 10), the value sensed by the first pressure sensor 22 (i.e., pressure on the inlet side (suction pipe) of the compressor 10), and the value sensed by the second pressure sensor 24 (i.e., pressure on the outlet side (discharge pipe) of the compressor 10). Here, although the calculation of a compression ratio is not described in detail, those skilled in the art will sufficiently appreciate such calculation from the detailed description of the present specification and well-known technology.

Then, the control unit 26 compares the calculated compression ratio with a Surge Limit Line (SLL) (see FIG. 1) at step S14. Here, the calculated compression ratio may be the status of the compressor 10. Further, the control unit 26 is assumed to previously store a graph having an SLL that may be a comparison target.

As a result of the comparison, when the status of the compressor approaches the SLL and then a possibility of a surge occurring is strong (Yes at step S16), the control unit 26 determines whether the cause of the strong surge possibility is due to a high compression ratio attributable to high resistance on the outlet side or to a low flow rate at step S18. Here, whether resistance is high or whether a flow rate is low may be sufficiently determined based on the values sensed by the pressure sensors 22 and 24 or the value sensed by the flow sensor 20. If the value sensed by the second pressure sensor 24 is greater than the value sensed by the first pressure sensor 22 by a preset difference or more, it may be determined that the resistance is high. In the case of a flow rate, if the value sensed by the flow sensor 20 is less than a preset value, it may be determined that the flow rate is low.

If it is determined at step S18 that the flow rate is not low and the resistance is high, the control unit 26 opens the third valve 18 at step S20. Here, the first valve 12 is in an open state, and the second valve 14 is in a close state. Accordingly, the resistance on the outlet side of the compressor 10 is decreased. In other words, as the third valve 18 is opened, gas on the discharge pipe of the compressor 10 is input to the gas tank 16 via the third valve 18, and thus the resistance on the outlet side of the compressor 10 is decreased.

In contrast, when the flow rate is low, the control unit 26 closes the first valve 12 and opens the second valve 14 at step S22. At this time, the third valve 18 is in a close state. Therefore, gas input to the gas tank 16 is blocked, and gas is output from the gas tank 16 to the compressor 10, thus increasing the total amount of gas input to the compressor 10.

Figure 6:
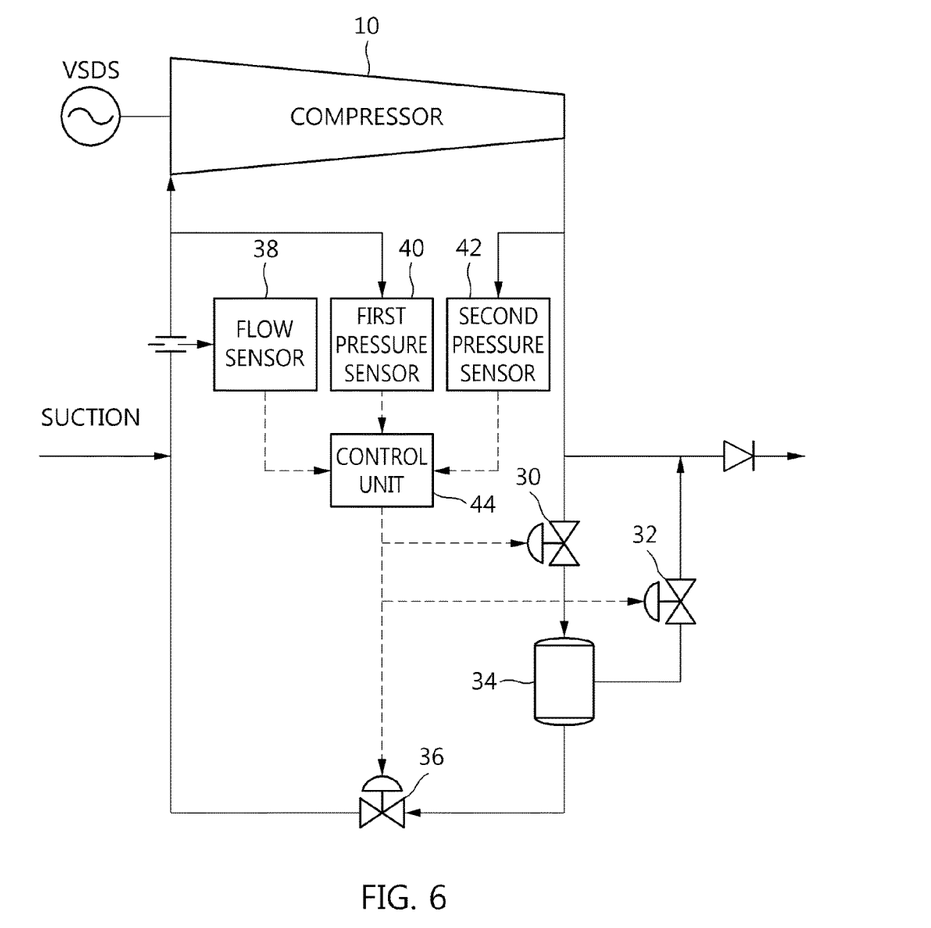
FIG. 6 is a diagram showing the configuration of a surge prevention apparatus for a centrifugal compressor according to a second embodiment of the present invention.

FIG. 6 is a diagram showing the configuration of a surge prevention apparatus for a centrifugal compressor according to a second embodiment of the present invention.

A recycle scheme that is generally used as a scheme for decreasing resistance on a discharge pipe, which corresponds to a second cause of a surge occurring in the centrifugal compressor, may reduce waste of gas compared to a blow-off scheme, but is disadvantageous in that the production efficiency of the compressor is decreased.

In order to solve this problem, as shown in FIG. 6, a gas tank 34 is added to a recycle configuration connected from a discharge pipe to a suction pipe.

The surge prevention apparatus for a centrifugal compressor shown in FIG. 6 includes a first valve 30, a second valve 32, the gas tank 34, a third valve 36, a flow sensor 38, a first pressure sensor 40, a second pressure sensor 42, and a control unit 44.

The first valve 30 (valve 1), the second valve 32 (valve 2), and the gas tank 34 are installed on the outlet side (i.e., discharge pipe side) of a compressor 10. Here, the first valve (valve 1) 30 controls the flow of gas that is input to the gas tank 34. The second valve 32 (valve 2) controls the flow of gas that is output from the gas tank 34 to the discharge pipe. By such control, when a possibility of a surge occurring becomes strong, gas from the outlet of the compressor 10 is stored in the gas tank 34 interposed between the suction pipe and the discharge pipe, rather than being directly transferred from the outlet to the inlet of the compressor. In this way, when gas present on the outlet side (discharge pipe side) is moved to the gas tank 34, and resistance on the outlet side is decreased, a possibility of a surge occurring is decreased. When a possibility of a surge occurring is decreased, gas stored in the gas tank 34 is transmitted to the existing outlet pipe (i.e., discharge pipe) without being transmitted to the inlet side (suction pipe), thus preventing gas from being recycled. In this way, a decrease in the production efficiency of compressors may be minimized due to recycling while a possibility of a surge occurring is decreased. The operation of opening/closing the first valve 30 and the second valve 32 is performed under the control of the control unit 44.

The third valve 36 (valve 3) is maintained in a close state when the compressor 10 is normally operated. The third valve 36 is opened when the cause of the strong possibility of a surge occurring is due to the fact that the amount of gas (flow rate) input to the compressor 10 is low. As the third valve 36 is opened, gas in the gas tank 34 may be input to the compressor 10. The operation of opening/closing the third valve 36 is performed under the control of the control unit 44.

The flow sensor 38 senses the amount of gas (flow rate) input to the compressor 10.

The first pressure sensor 40 senses pressure on the suction pipe (i.e., the inlet side of the compressor 10).

The second pressure sensor 42 senses pressure on the discharge pipe (i.e., the outlet side of the compressor 10).

The control unit 44 controls the opening/closing of the valves 30, 32, and 36 based on the values sensed by the flow sensor 38 and the pressure sensors 40 and 42.

VSDS shown in FIG. 6 denotes a variable speed drive system.

Although not shown in the drawing, the first valve 30, the second valve 32, and the gas tank 34 in FIG. 6 may be collectively designated as a gas provision unit. Therefore, the gas provision unit may store a part of gas from the outlet side of the compressor 10 in response to a control signal from the control unit 44, and may provide the stored gas to the inlet side of the compressor 10. Consequently, the first valve 30, the second valve 32, and the gas tank 34 may be an example of a gas provision unit described in claim 8 of the accompanying claims of the present invention. Of course, if necessary, the third valve 36 may be added to the gas provision unit.

Figure 7:
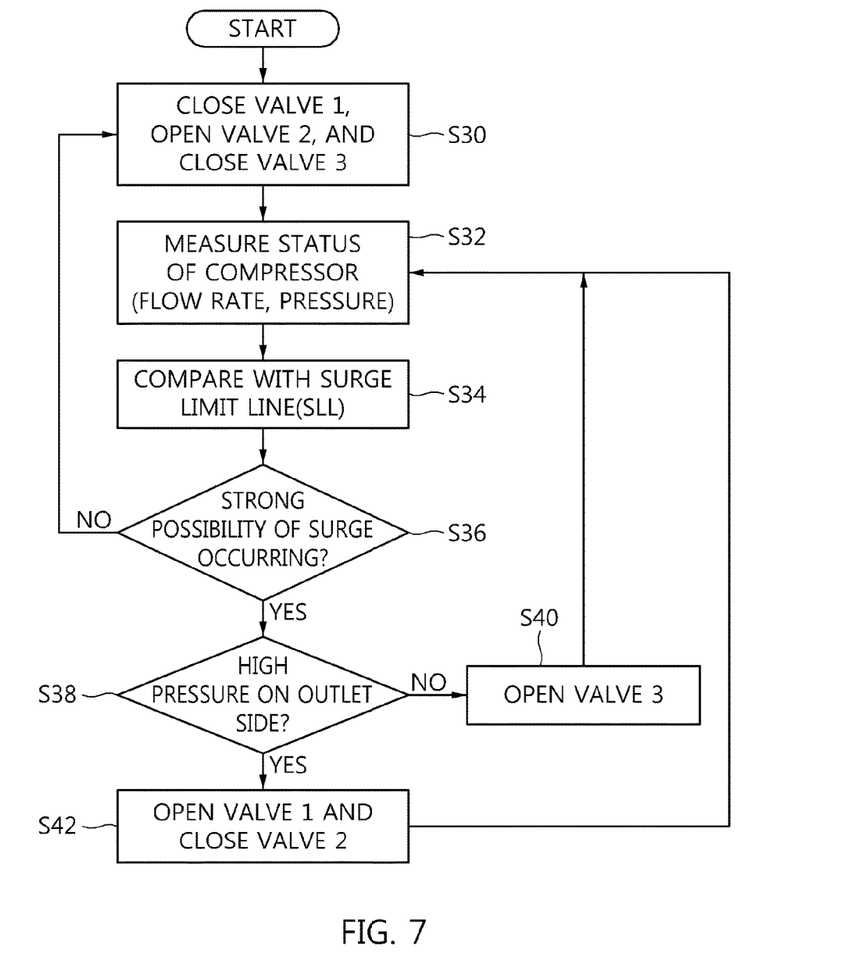
FIG. 7 is a flowchart showing a surge prevention method for a centrifugal compressor according to a second embodiment of the present invention.

FIG. 7 is a flowchart showing a surge prevention method for a centrifugal compressor according to a second embodiment of the present invention.

When the compressor is normally operated, the first valve 30 is closed and the second valve 32 connected from the gas tank 34 to the outlet side (discharge pipe) is opened so that gas is not input to the gas tank 34 at step S30. At step S30, the third valve 36 for controlling recycling at the outlet of the compressor is also closed. Further, at step S30, the operation of opening/closing the valves 30, 32, and 36 is performed by the control unit 44.

Thereafter, to determine whether there is a possibility of a surge occurring in the compressor 10, the control unit 44 measures the status of the compressor 10 at step S32. That is, the flow sensor 38 senses the flow rate of gas input to the compressor 10, the first pressure sensor 40 senses pressure on the inlet side of the compressor 10, and the second pressure sensor 42 senses pressure on the outlet side of the compressor 10. Thereafter, the control unit 44 calculates a compression ratio based on the value sensed by the flow sensor 38 (i.e., a value obtained by sensing the flow rate of gas input to the compressor 10), the value sensed by the first pressure sensor 40 (i.e., pressure on the inlet side (suction pipe) of the compressor 10), and the value sensed by the second pressure sensor 42 (i.e., pressure on the outlet side (discharge pipe) of the compressor 10). Here, although the calculation of a compression ratio is not described in detail, those skilled in the art will sufficiently appreciate such calculation from the detailed description of the present specification and well-known technology.

Then, the control unit 44 compares the calculated compression ratio with a Surge Limit Line (SLL) (see FIG. 1) at step S34. Here, the calculated compression ratio may be the status of the compressor 10. Further, the control unit 44 is assumed to previously store a graph having an SLL that may be a comparison target.

As a result of the comparison, when the status of the compressor approaches the SLL and then a possibility of a surge occurring is strong (Yes at step S36), the control unit 44 determines whether the cause of the strong surge possibility is due to a high compression ratio attributable to high resistance on the outlet side or to a low flow rate at step S38. Here, whether resistance is high or whether a flow rate is low may be sufficiently determined based on the values sensed by the pressure sensors 40 and 42 or the value sensed by the flow sensor 38. If the value sensed by the second pressure sensor 42 is greater than the value sensed by the first pressure sensor 40 by a preset difference or more, it may be determined that the resistance is high. In the case of a flow rate, if the value sensed by the flow sensor 38 is less than a preset value, it may be determined that the flow rate is low.

If it is determined at step S38 that the flow rate is low, the control unit 44 opens the third valve 36 at step S40. Accordingly, gas stored in the gas tank 34 flows into the inlet side of the compressor 10, and thus the total amount of gas input to the compressor 10 is increased.

In contrast, when the flow rate is not low, and the resistance is high (i.e., when pressure on the discharge pipe is high), the control unit 44 opens the first valve 30 and closes the second valve 32 at step S42. At this time, the third valve 36 is maintained in a close state. Accordingly, gas on the discharge pipe flows into the gas tank 34, and then resistance on the outlet side of the compressor is decreased. In this way, when the status of the compressor 10 returns to normal, the first valve 30 and the third valve 36 are closed, and the second valve 32 is opened, thus enabling compressed gas contained in the gas tank 34 to flow through the existing pipe (i.e., the outlet side).

Meanwhile, in the description of the above-described embodiment, the gas tank 16 that is a gas storage space is installed on the inlet side of the compressor 10 to reduce the occurrence of a surge or, alternatively, the gas tank 34 is provided in the recycle configuration connected from the discharge pipe to the suction pipe. As occasion demands, a configuration in which the valves 12 and 14 and the gas tank 16 are installed on the inlet side of the compressor 10, as shown in FIG. 4, and a configuration in which the valves 30 and 32 and the gas tank 34 are installed on the outlet side of the compressor 10, as shown in FIG. 6, may be implemented together.

In accordance with the present invention having the above configuration, a gas tank is installed on the inlet side of the centrifugal compressor, so that, when a possibility of a surge occurring becomes strong, the flow rate of gas input to the compressor may be controlled.

Meanwhile, a gas tank is installed on the outlet side of a compressor, thus reducing the amount of gas recycled when a surge occurs.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A surge prevention apparatus for a centrifugal compressor, comprising:
    a control unit for controlling a gas provision operation based on a flow rate and pressure on an inlet side of a compressor and pressure on an outlet side of the compressor; and
    a gas provision unit for storing a part of gas flowing into the inlet side of the compressor and providing the stored gas to the inlet side in response to a control signal from the control unit.

2. The surge prevention apparatus of claim 1, wherein the gas provision unit comprises:
    a gas tank installed on the inlet side of the compressor;
    a first valve configured to control a flow of gas that is input from the inlet side to the gas tank; and
    a second valve configured to control a flow of gas from the gas tank to the compressor.

3. The surge prevention apparatus of claim 2, wherein the gas provision unit further comprises a third valve for controlling a flow of gas that is input from the outlet side of the compressor to the gas tank.

4. The surge prevention apparatus of claim 3, wherein the control unit controls the first to third valves based on values sensed by a flow sensor and a first pressure sensor installed on the inlet side of the compressor and by a second pressure sensor installed on the outlet side of the compressor.

5. The surge prevention apparatus of claim 4, wherein the control unit is configured to, if it is determined based on the sensed values that the compressor is normally operated, open the first valve and close the second valve and the third valve.

6. The surge prevention apparatus of claim 4, wherein the control unit is configured to, if it is determined based on the sensed values that a possibility of a surge occurring in the compressor is strong, close the first valve and open the second valve when a cause of the strong surge possibility is due to a low flow rate on the inlet side of the compressor.

7. The surge prevention apparatus of claim 4, wherein the control unit is configured to, if it is determined based on the sensed values that a possibility of a surge occurring in the compressor is strong, open the third valve when a cause of the strong surge possibility is due to high resistance on the outlet side of the compressor.

8. A surge prevention apparatus for a centrifugal compressor, comprising:
    a control unit for controlling a gas provision operation based on a flow rate and pressure on an inlet side of a compressor and pressure on an outlet side of the compressor; and
    a gas provision unit for storing a part of gas from the outlet side in response to a control signal from the control unit, and providing the stored gas to the inlet side of the compressor in response to a control signal from the control unit,
    wherein the gas provision unit comprises:
        a gas tank installed on the outlet side of the compressor;
        a first valve configured to control a flow of gas that is input from the outlet side to the gas tank; and a second valve configured to control a flow of gas from the gas tank to the outlet side of the compressor.

9. The surge prevention apparatus of claim 8, wherein the gas provision unit further comprises a third valve for controlling a flow of gas that is input from the gas tank to the inlet side of the compressor.

10. The surge prevention apparatus of claim 9, wherein the control unit controls the first to third valves based on values sensed by a flow sensor and a first pressure sensor installed on the inlet side of the compressor and by a second pressure sensor installed on the outlet side of the compressor.

11. The surge prevention apparatus of claim 10, wherein the control unit is configured to, if it is determined based on the sensed values that the compressor is normally operated, close the first valve and the third valve and open the second valve.

12. The surge prevention apparatus of claim 10, wherein the control unit is configured to, if it is determined based on the sensed values that a possibility of a surge occurring in the compressor is strong, open the third valve when a cause of the strong surge possibility is due to a low flow rate on the inlet side of the compressor.

13. The surge prevention apparatus of claim 10, wherein the control unit is configured to, if it is determined based on the sensed values that a possibility of a surge occurring in the compressor is strong, open the first valve and close the second valve and the third valve when a cause of the strong surge possibility is due to high resistance on the outlet side of the compressor.

14. A surge prevention method for a centrifugal compressor, comprising:
   determining, by a control unit, whether a possibility of a surge occurring in a compressor is strong, based on values sensed by a flow sensor and a first pressure sensor on an inlet side of the compressor and by a second pressure sensor on an outlet side of the compressor;
   if it is determined that the possibility of a surge occurring in the compressor is strong, storing, by the control unit, a part of gas from the outlet side of the compressor in a gas provision unit installed on the outlet side of the compressor when a cause of the strong surge possibility is due to high resistance on the outlet side; and
   if it is determined that the possibility of a surge occurring in the compressor is strong, providing, by the control unit, the gas stored in the gas provision unit to the inlet side of the compressor when a cause of the strong surge possibility is due to a low flow rate on the inlet side,
   wherein: the gas provision unit comprises a gas tank installed on the outlet side of the compressor, a first valve configured to control a flow of gas that is input from the outlet side to the gas tank, a second valve configured to control a flow of gas from the gas tank to the outlet side of the compressor, and a third valve configured to control a flow of gas that is input from the gas tank to the inlet side of the compressor, and storing the part of gas from the outlet side of the compressor in the gas provision unit comprises opening the first valve and closing the second valve and the third valve.

15. A surge prevention method for a centrifugal compressor, comprising:
   determining, by a control unit, whether a possibility of a surge occurring in a compressor is strong, based on values sensed by a flow sensor and a first pressure sensor on an inlet side of the compressor and by a second pressure sensor on an outlet side of the compressor;
   if it is determined that the possibility of a surge occurring in the compressor is strong, storing, by the control unit, a part of gas from the outlet side of the compressor in a gas provision unit installed on the outlet side of the compressor when a cause of the strong surge possibility is due to high resistance on the outlet side; and
   if it is determined that the possibility of a surge occurring in the compressor is strong, providing, by the control unit, the gas stored in the gas provision unit to the inlet side of the compressor when a cause of the strong surge possibility is due to a low flow rate on the inlet side,
   wherein: the gas provision unit comprises a gas tank installed on the outlet side of the compressor, a first valve configured to control a flow of gas that is input from the outlet side to the gas tank, a second valve configured to control a flow of gas from the gas tank to the outlet side of the compressor, and a third valve configured to control a flow of gas that is input from the gas tank to the inlet side of the compressor, and providing the gas stored in the gas provision unit to the inlet side comprises opening the third valve.

* * * * *